United States Patent
Cossa

(10) Patent No.: US 9,621,618 B2
(45) Date of Patent: Apr. 11, 2017

(54) PACKET ANALYZER DEVICE AND METHOD TO MEASURE A VIDEO QUALITY OF TRANSMITTED IP MULTICAST MEDIA

(71) Applicant: TELEFONAKTIEBOLAGET L M ERICSSON (PUBL), Stockholm (SE)

(72) Inventor: Marcos Eduardo Cossa, McKinney, TX (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 206 days.

(21) Appl. No.: 14/578,863

(22) Filed: Dec. 22, 2014

(65) Prior Publication Data
US 2016/0182598 A1    Jun. 23, 2016

(51) Int. Cl.
| H04L 12/26 | (2006.01) |
| H04L 29/06 | (2006.01) |
| H04L 12/18 | (2006.01) |
| H04L 1/00 | (2006.01) |
| H04N 21/00 | (2011.01) |

(52) U.S. Cl.
CPC ............. H04L 65/80 (2013.01); H04L 1/00 (2013.01); H04L 12/189 (2013.01); H04L 12/1868 (2013.01); H04L 43/0829 (2013.01); H04L 65/4076 (2013.01); H04N 21/00 (2013.01)

(58) Field of Classification Search
CPC ........ H04W 28/04; H04W 72/005; H04L 1/22
USPC .................................... 370/218, 230, 230.1
See application file for complete search history.

(56) References Cited

U.S. PATENT DOCUMENTS

| 2003/0005387 | A1* | 1/2003 | Tsunoda | H03M 13/00 714/785 |
| 2004/0078624 | A1* | 4/2004 | Maxemchuk | H04L 12/1868 714/4.2 |
| 2005/0160184 | A1* | 7/2005 | Walsh | H04L 12/1868 709/247 |
| 2005/0198343 | A1* | 9/2005 | Yoshimura | H04L 29/06027 709/231 |
| 2005/0216472 | A1* | 9/2005 | Leon | H04L 12/1863 |
| 2006/0018568 | A1* | 1/2006 | Costello | B65F 1/00 383/4 |
| 2006/0023652 | A1* | 2/2006 | Vedantham | H04L 12/1868 370/312 |
| 2008/0313191 | A1* | 12/2008 | Bouazizi | H04L 12/1863 |

FOREIGN PATENT DOCUMENTS

JP       2256991  A1 * 12/2010  .......... H04L 1/0009

OTHER PUBLICATIONS

Schulzrinne, et al.: "RTP: A Transport Protocol for Real-Time Applications". Network Working Group, Request for Comments: 3550. Jul. 2005.

(Continued)

Primary Examiner — Ricky Ngo
Assistant Examiner — Dewanda Samuel

(57) ABSTRACT

A packet analyzer device and method are described herein that measure a video quality of IP multicast media. In one embodiment, the packet analyzer device and method measure a video quality of transmitted IP multicast media when the transmission of the IP multicast media involves the use of Forward Error Correction (FEC) in accordance with the FLUTE protocol.

18 Claims, 12 Drawing Sheets

(56) References Cited

OTHER PUBLICATIONS

Paila, et al.: "FLUTE—File Delivery over Unidirectional Transport". Internet Engineering Task Force (IETF) Request for Comments: 6726. Nov. 2012.
M. Watson: "Basic Forward Error Correction (FEC) Schemes". Network Working Group Request for Comments: 5445. Mar. 2009.
Information Technology—Dynamic adaptive streaming over HTTP (DASH)—Part 1: Media presentation description and segment formats. ISO/IEC 23009-1, second edition (May 15, 2014).

* cited by examiner

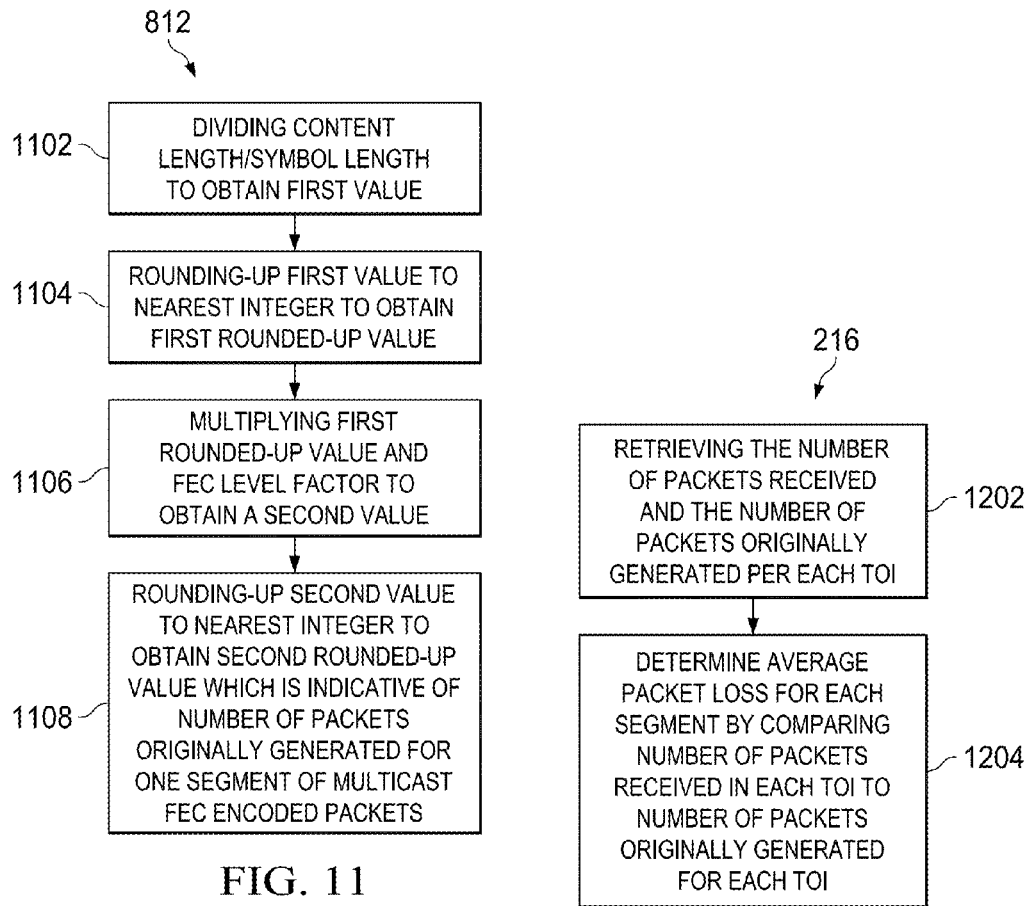

PACKET ANALYZER DEVICE AND METHOD TO MEASURE A VIDEO QUALITY OF TRANSMITTED IP MULTICAST MEDIA

TECHNICAL FIELD

The present disclosure relates to a packet analyzer device and method to measure a video quality of transmitted IP multicast media. In one embodiment, the packet analyzer device and method measure a video quality of transmitted IP multicast media when the transmission of the IP multicast media involves the use of Forward Error Correction (FEC) in accordance with the FLUTE protocol.

BACKGROUND

The following abbreviations are herewith defined, at least some of which are referred to within the following description of the prior art and the present invention.
ALC Asynchronous Layered Coding
FDT File Delivery Table
FEC Forward Error Correction
FLUTE File Delivery over Unidirectional Transport
HTTP Hypertext Transfer Protocol
IP Internet Protocol
IPTV Internet Protocol Television
LTE Long Term Evolution
MPEG-DASH Moving Picture Expert Group-Dynamic Adaptive Streaming over HTTP
RTP Real-Time Transport Protocol
SDI Serial Digital Interface
TOI Transport Object Identifier
UE User Equipment
UDP User Datagram Protocol
XML Extensible Markup Language IPTV Video Quality of Service is a rather well-known area of technology, where by using multiple probes and relying on protocols like RTP it is possible to identify and measure factors like packet loss and jitter that impact the video quality of a transmitted IP media stream. However, for IP multicast media transmitted over Wi-Fi, LTE, or any system that utilizes Forward Error Correction (FEC), the IPTV Video Quality of Service becomes opaque as the RTP protocol is replaced by the use of the FLUTE protocol. The FLUTE protocol is where the IP media stream's is transported in a unidirectional way and its payload is encoded into source and redundant symbols/packets (sometimes using proprietary FEC schemes) which prevents the traditional probes from measuring the video quality as a function of packet loss and jitter. Accordingly, there is a need to address this problem to be able to measure the video quality of IP multicast media which is transmitted by a system that utilizes FEC. This need and other needs are satisfied by the packet analyzer device and method of the present invention.

SUMMARY

A packet analyzer device and a method which measure a video quality of transmitted IP multicast media in a manner that overcomes the aforementioned problem are described in the independent claims. Advantageous embodiments of the packet analyzer device and the method are further described in the dependent claims.

In one aspect, the present invention provides a packet analyzer device which is configured to measure a video quality of transmitted IP multicast media. The packet analyzer device comprises at least one processor, and at least one memory that stores processor-executable instructions, wherein the at least one processor interfaces with the at least one memory to execute the processor-executable instructions, whereby the packet analyzer device is operable to perform a capture operation, a first determine operation, a second determine operation, and an analyze operation. In the capture operation, the packet analyzer device captures the IP multicast media comprising a plurality of segments of multicast FEC encoded packets. In the first determine operation, the packet analyzer device determines a number of packets received in each segment of the multicast FEC encoded packets. In the second determine operation, the packet analyzer device determines a number of packets that had been originally generated for each segment of the multicast FEC encoded packets. In the analyze operation, the packet analyzer device analyzes at least the number of packets received in each segment of the multicast FEC encoded packets and the number of packets that had been originally generated for each segment of the multicast FEC encoded packets to determine one or more KPIs which are indicative of the video quality of the IP multicast media. An advantage associated with the packet analyzer device is that the video quality of the IP multicast media can be determined by using a single probe and without relying on RTP protocol information.

In another aspect, the present invention provides a method in a packet analyzer device for measuring a video quality of transmitted IP multicast media. The method comprises a capture operation, a first determine operation, a second determine operation, and an analyze operation. In the capture operation, the packet analyzer device captures the IP multicast media comprising a plurality of segments of multicast FEC encoded packets. In the first determine operation, the packet analyzer device determines a number of packets received in each segment of the multicast FEC encoded packets. In the second determine operation, the packet analyzer device determines a number of packets that had been originally generated for each segment of the multicast FEC encoded packets. In the analyze operation, the packet analyzer device analyzes at least the number of packets received in each segment of the multicast FEC encoded packets and the number of packets that had been originally generated for each segment of the multicast FEC encoded packets to determine one or more KPIs which are indicative of the video quality of the IP multicast media. An advantage associated with the method is that the video quality of the IP multicast media can be determined by using a single probe and without relying on RTP protocol information.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIGS. 4-7 illustrate a flowchart and several snapshot images of various files which are used to explain an exemplary way to implement a first determining step of the method of FIG. 2 to determine a number of packets received in each segment of the IP multicast stream in accordance with an embodiment of the present invention;

FIGS. 8-11 illustrate two flowcharts and several snapshot images of various files which are used to explain an exemplary way to implement a second determining step of the method of FIG. 2 to determine the number of packets that had been originally generated for each segment of the IP multimedia stream in accordance with an embodiment of the present invention; and, FIGS. 12-13 illustrate a flowchart and a snapshot image of a file which are used to explain an exemplary way to implement an analyzing step of the method of FIG. 2 to determine one or more KPIs which are indicative of the video quality of the IP multicast media in accordance with an embodiment of the present invention.

DETAILED DESCRIPTION

Figure 1:
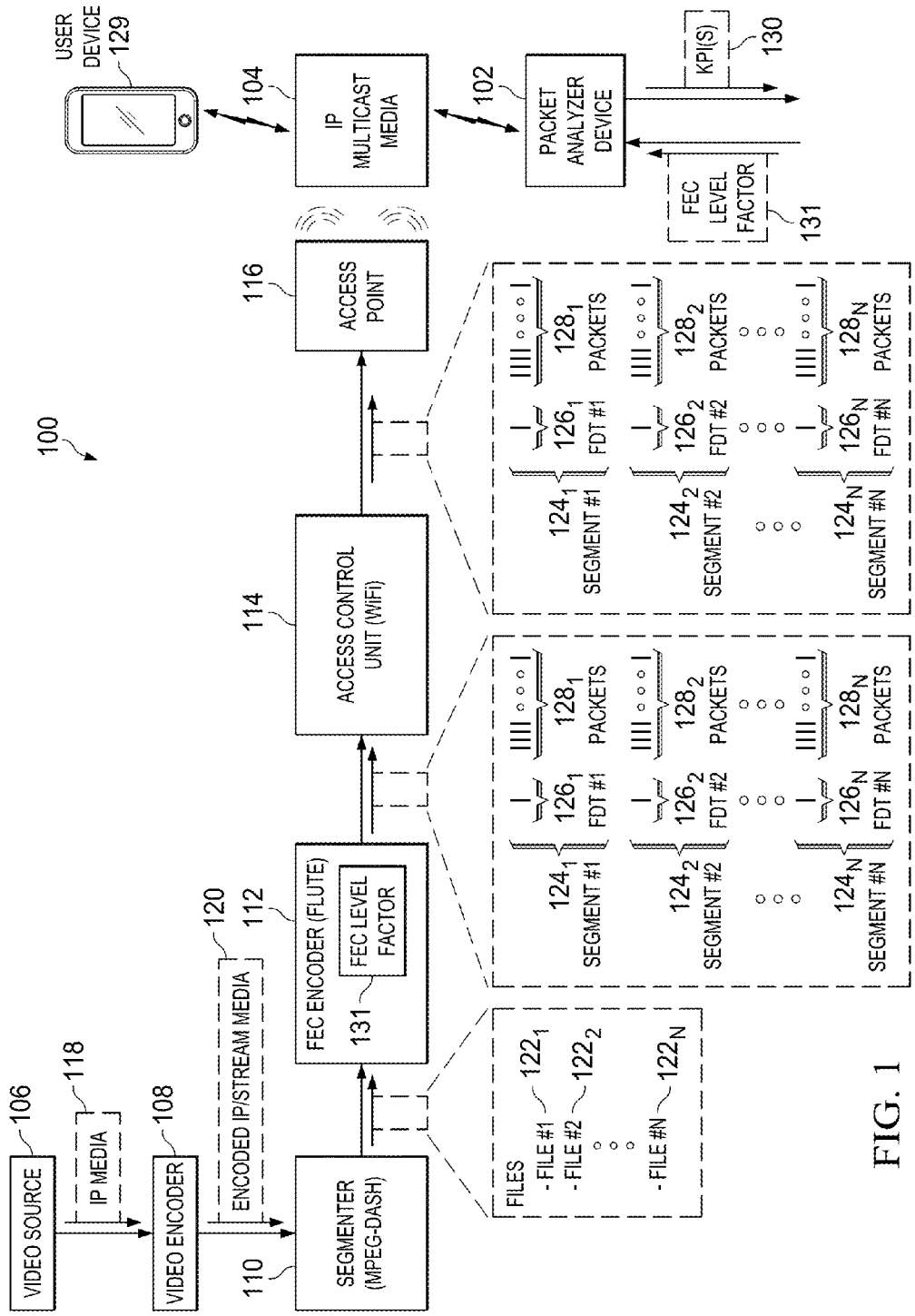
FIG. 1 is a diagram of an exemplary system in which a packet analyzer is used to measure a video quality of transmitted IP multicast media in accordance with an embodiment of the present invention.

Referring to FIG. 1, there is a diagram of an exemplary system 100 in which a packet analyzer 102 is used to measure a video quality of IP multicast media 104 in accordance with an embodiment of the present invention. Although the exemplary system 100 described hereinafter is based on Wi-Fi it should be appreciated that the packet analyzer 102 can be used with any type of system such as, for example, LTE, fiber optics, UDP Ethernet that utilizes FEC in accordance with the FLUTE protocol to transmit IP multicast media. For a more detailed description of FLUTE technology reference is made to RFC 6726 entitled "FLUTE-File Delivery Over Unidirectional Transport" November 2012 (the contents of which are hereby incorporated by reference herein). It should be further appreciated that the present invention could still be used in a system that implements a future version of FEC or FLUTE.

As shown, the exemplary system 100 comprises a video source 106, a video encoder 108, a MPEG-DASH segmenter 110, a FEC encoder 112, an access control unit 114, and an access point 116. The video source 106 (e.g., head-end 106, SDI 106) supplies IP media 118 (e.g., IP multicast stream 118) to the video encoder 108. The video encoder 108 receives the IP media 118 and outputs an encoded IP media stream 120 (unicast or multicast). The MPEG-DASH segmenter 110 receives the encoded IP media stream 120 and outputs multiple files $122_1, 122_2 \ldots 122_n$. The FEC encoder 112 receives the files $122_1, 122_2 \ldots 122_n$ and outputs multiple segments of multicast FEC encoded IP packets $124_1, 124_2 \ldots 124_n$, where each segment $124_1, 124_2 \ldots 124_n$ respectively comprises at least one File Delivery Table (FDT) $126_1, 126_2 \ldots 126_n$ and multiple packets $128_1, 128_2 \ldots 128_n$ (source packets and redundant packets). The access control unit 114 receives and forwards the segments of multicast FEC encoded IP packets $124_1, 124_2 \ldots 124_n$ to the access point 116. The access point 116 wirelessly transmits the segments of multicast FEC encoded IP packets $124_1, 124_2 \ldots 124_n$ (IP multicast media 104) which are received by one or more user devices 130 (only one shown) and the packet analyzer device 102. The packet analyzer device 102 would be positioned relatively near to the user device 129 (e.g., laptop computer 129, smartphone 129, television 129, tablet 129, UE 129) such that when the packet analyzer 102 measures the video quality of the transmitted IP multicast media 104 then those quality measurements 130 (KPIs 130) would also be indicative of the video quality of the transmitted IP multicast media 104 that is received by the user device 129. Thereafter, the network operator could use the quality measurements 130 (KPIs 130) to adjust the settings of the FEC encoder 112 such as a FEC level factor 131 and/or the settings of the access point 116 such as a modulation to improve the quality of the IP multicast media 104 that is received by the user device 129. A detailed discussion about how the packet analyzer device 102 is configured and operates to measure the video quality of the IP multicast media 104 is provided next with respect to FIGS. 2-13.

Figure 2:
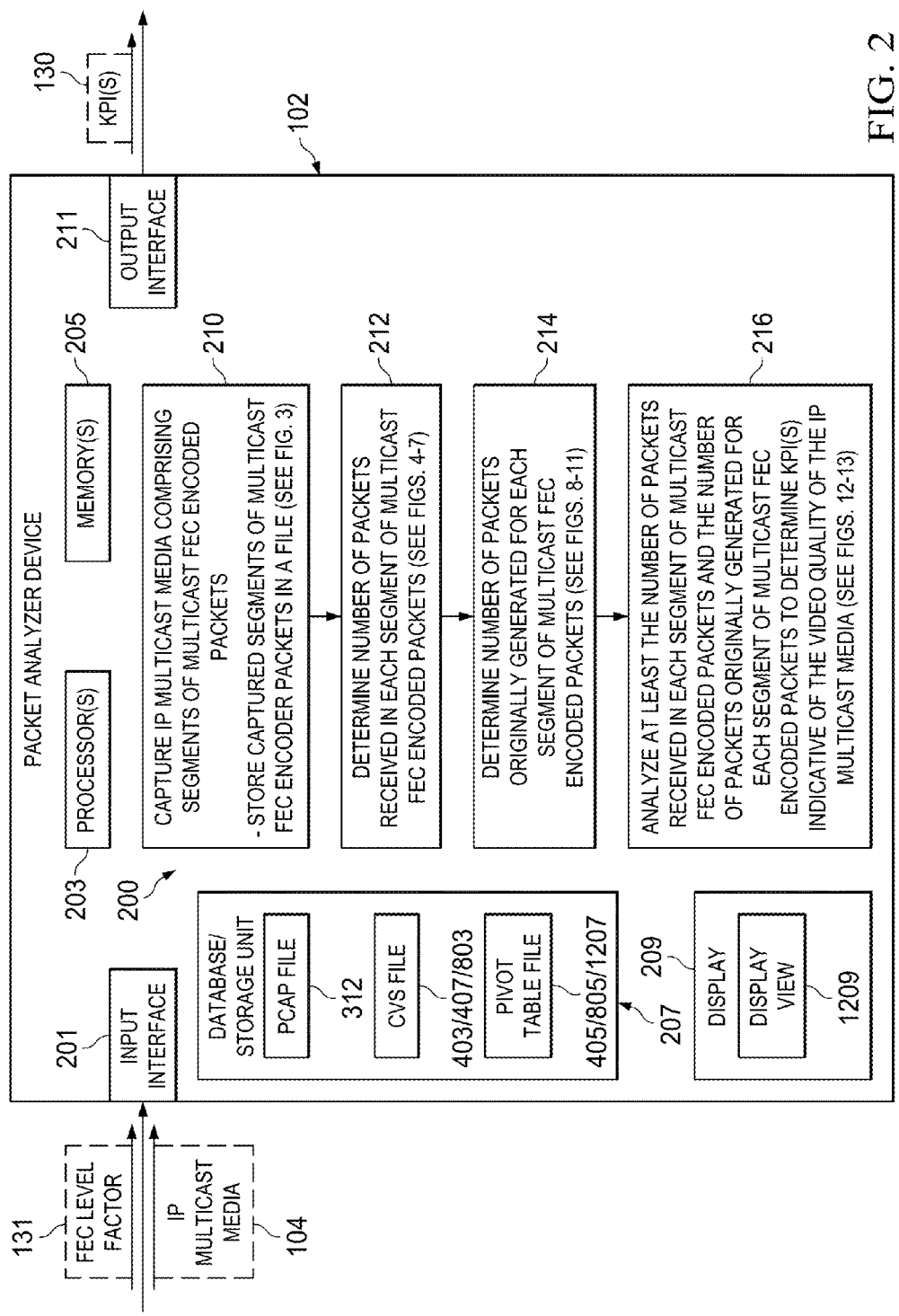
FIG. 2 is a diagram of the packet analyzer which is configured to implement a method to measure the video quality of the transmitted IP multicast media in accordance with an embodiment of the present invention.

Referring to FIG. 2, there is a diagram of the packet analyzer device 102 which is configured to implement a method 200 to measure the video quality of the IP multicast media 104 in accordance with an embodiment of the present invention. The packet analyzer device 102 comprises an input interface 201, at least one processor 203, at least one memory 205, a database 207 (storage unit 207), a display 209 (optional), and an output interface 211. The packet analyzer device 102 may include many other components which are well known in the art such as an antenna but for clarity the well known components are not described herein. The packet analyzer device 102 functions wherein the at least one processor 203 interfaces with the at least one memory 205 to execute processor-executable instructions stored therein, whereby the packet analyzer device 102 is operable to implement the various steps (operations) of method 200 to measure the video quality of the IP multicast media 104. Beginning at step 210, the packet analyzer device 102 captures the transmitted IP multicast media 104 which comprises the multiple segments of multicast FEC encoded packets $124_1, 124_2 \ldots 124_n$ (see FIG. 3). At step 212, the packet analyzer device 102 determines a number of packets received in each segment of the multicast FEC encoded packets $124_1, 124_2 \ldots 124_n$ (see FIGS. 4-7). At step 214, the packet analyzer device 102 determines a number of packets that had been originally generated by the FEC encoder device 112 for each segment of the multicast FEC encoded packets $124_1, 124_2 \ldots 124_n$ (see FIGS. 8-11). At step 216, the packet analyzer device 102 analyzes at least the number of packets received in each segment of the multicast FEC encoded packets $124_1, 124_2 \ldots 124_n$ and the number of packets that had been originally generated for each segment of the multicast FEC encoded packets $124_1, 124_2 \ldots 124_n$ to determine one or more KPIs 130 which are indicative of the video quality of the transmitted IP multicast media 104 (see FIGS. 12-13). As shown, the input interface 201 receives the IP multicast media 104 (wirelessly transmitted) and the FEC level factor 131 (user input) while the output interface 211 outputs the one or more KPIs 130 which are indicative of the video quality of the transmitted IP multicast media 104.

Figure 3:
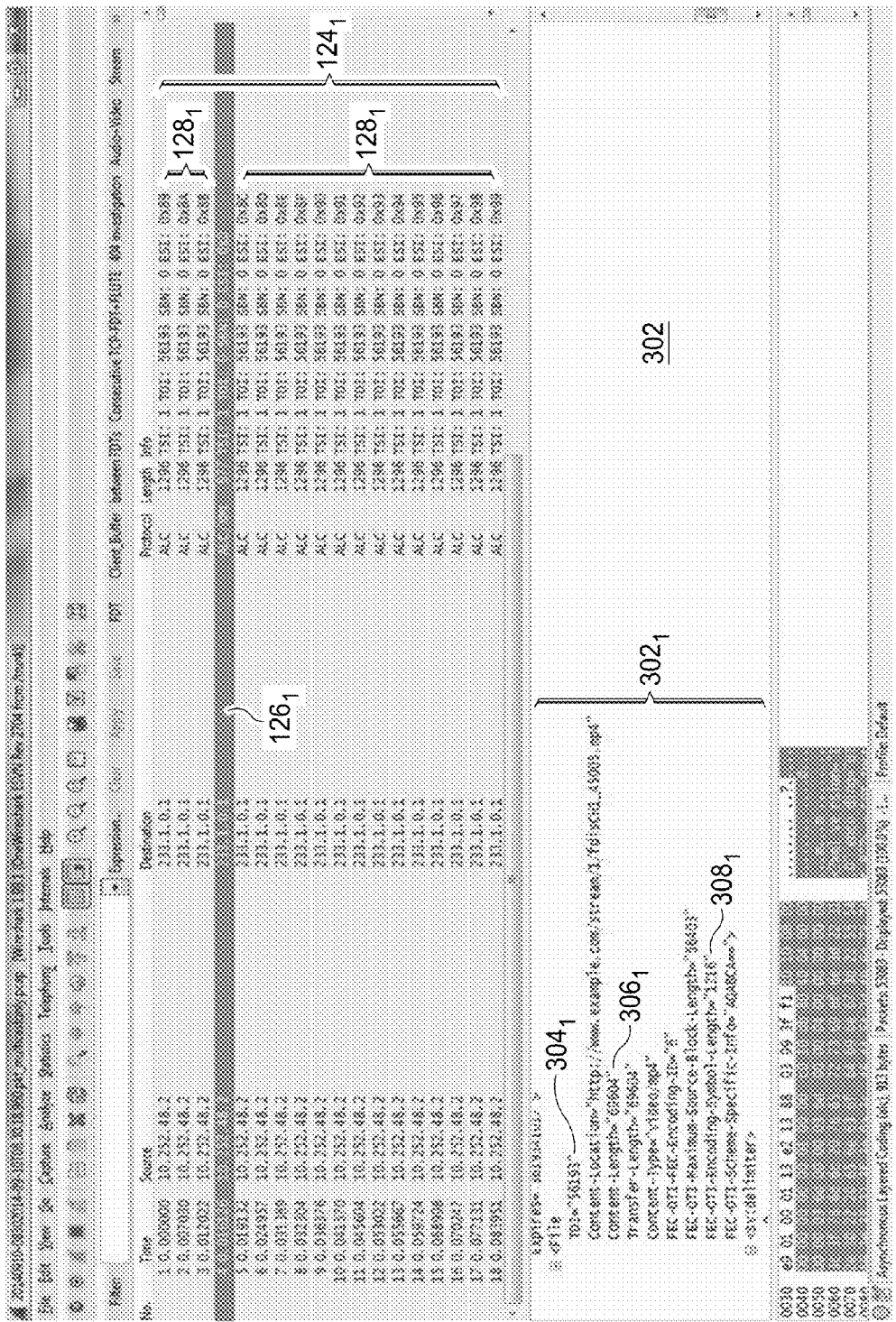
FIG. 3 is a snapshot image of a PCAP file which is used to explain an exemplary way to implement a capture step of the method of FIG. 2 to capture the IP multicast media in accordance with an embodiment of the present invention.

Referring to FIG. 3, there is a snapshot image of a PCAP file 302 which is used to further explain an exemplary way to implement the capture step 210 of method 200 in accordance with an embodiment of the present invention. As discussed above, the packet analyzer device 102 at step 210 captures (receives) the transmitted IP multicast media 104 which comprises the multiple segments of multicast FEC encoded packets $124_1, 124_2 \ldots 124_n$. The capture step 210 further comprises storing the captured plurality of segments of multicast FEC encoded packets $124_1, 124_2 \ldots 124_n$ in a file 302 (e.g., a PCAP file 302) within the database 207. It should be appreciated that the segments of multicast FEC encoded IP packets $124_1, 124_2 \ldots 124_n$ each comprise at least one FDT $126_1, 126_2 \ldots 126_n$ (ALC/XML FDT metaframe $126_1, 126_2 \ldots 126_n$ and multiple packets $128_1, 128_2 \ldots 128_n$ (ALC metaframes $128_1, 128_2 \ldots 128_n$). Further, the packet analyzer device 210 discards the payload of ALC metaframes $128_1, 128_2 \ldots 128_n$ but stores and uses in steps 214 and 216 the header and other control information associated with the payload. The exemplary PCAP file 302 shown illustrates a portion of the information associated with segment $124_1$ namely the FDT $126_1$ (ALC/XML FDT metaframe $126_1$) and some of the packets $128_1$ (ALC metaframes $128_1$). The snapshot image of the PCAP file 302 also illustrates a portion of the content $302_1$ (e.g., TOI $304_1$, content length $306_1$, and symbol length $308_1$) associated with the FDT $126_1$ (ALC/XML FDT metaframe $126_1$). In this example, the FDT $126_1$ (ALC/XML FDT metaframe $126_1$) and the packets $128_1$ (ALC metaframes $128_1$) all have the same TOI ("56193"). The file $122_1$ outputted by the MPEG-DASH segmenter 110 would also has the same TOI ("56193") as the FDT $126_1$ (ALC/XML FDT metaframe $126_1$) and the packets $128_1$ (ALC metaframes $128_1$). Likewise, the file $122_2$, FDT $126_2$ and multiple packets $128_2$ would all have the same TOI which is different from the TOI associated with the file $122_1$, FDT $126_1$ and multiple packets $128_1$. Plus, the file $122_n$, FDT $126_n$ and multiple packets $128_n$ would have the same TOI which is different from the TOIs associated with files $122_1, 122_2 \ldots 122_{n-1}$, FDTs $126_1, 126_2 \ldots 122_{n-1}$, and the multiple packets $128_1, 128_2 \ldots 122_{n-1}$. The exemplary PCAP file 302 will also be used later to help explain exemplary ways to implement the first and second determining steps 212 and 214.

Figure 4:
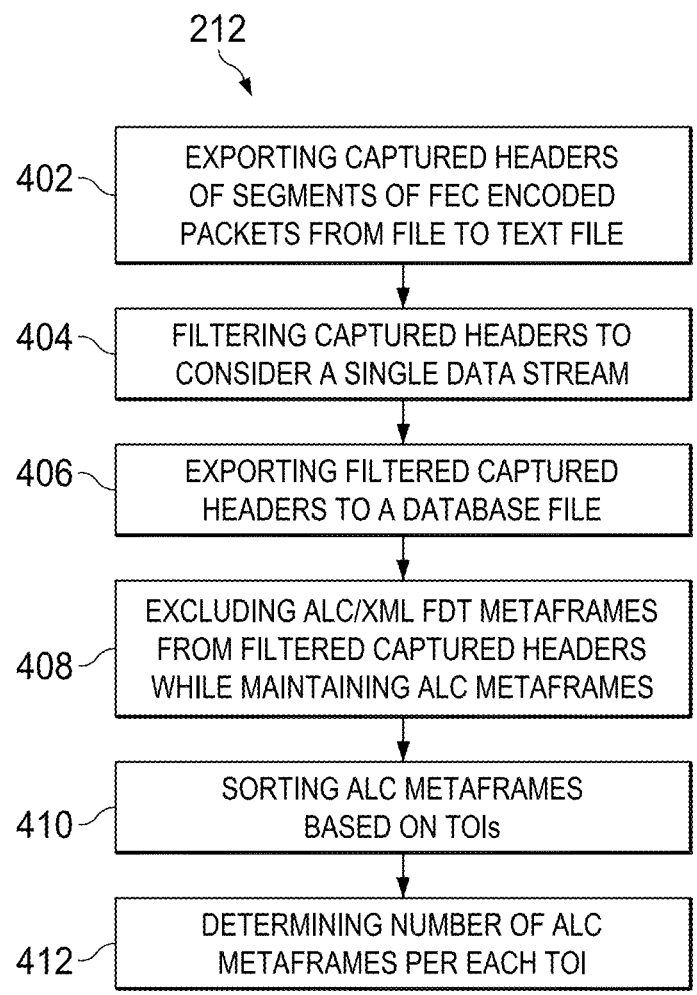

Referring to FIGS. 4-7, there are illustrated a flowchart and several snapshot images of various files 403, 405 and 407 which are used to explain an exemplary way to implement the determining step 212 of method 200 in accordance with an embodiment of the present invention. As discussed above, the packet analyzer device 102 implements step 212 to determine a number of packets received in each segment of the multicast FEC encoded packets $124_1, 124_2 \ldots 124_n$. For instance, the packet analyzer device 102 can implement step 212 by determining the number of ALC metaframes $128_1, 128_2 \ldots 128_n$ per each TOI $304_1, 304_2 \ldots 304_n$ which are obtained from the file 302 (PCAP file 302) whereby the number of the ALC metaframes $128_1, 128_2 \ldots 128_n$ per each TOI $304_1, 304_2 \ldots 304_n$ is indicative of the number of packets received per each segment of multicast FEC encoded packets $124_1, 124_2 \ldots 124_n$. FIG. 4 is a flowchart which illustrates the steps of an exemplary way that the packet analyzer device 102 can implement step 212 to determine the number of ALC metaframes $128_1, 128_2 \ldots 128_n$ per each TOI $304_1, 304_2 \ldots 304_n$ by using file 302 (PCAP file 302). At step 402, the packet analyzer device 102 exports captured headers (i.e., the ALC/XML FDT metaframe $126_1, 126_2 \ldots 126_n$ and ALC metaframes $128_1, 128_2 \ldots 128_n$) of the plurality of segments of multicast FEC encoded packets $124_1, 124_2 \ldots 124_n$ within the PCAP file 302 into a text file 403 (CVS file 403) (see FIGS. 5 and 6). At step 404, the packet analyzer device 102 filters the captured headers in the CVS file 403 to consider a single data stream. For instance, the packet analyzer device 102 can select an IP multicast destination address which is used to filter the captured headers to only consider a single data stream. At step 406, the packet analyzer device 102 exports the filtered captured headers to a database file 405 (Pivot Table file 405). At step 408, the packet analyzer device 102 excludes the ALC/XML FDT metaframes $126_1, 126_2 \ldots 126_n$ from the filtered captured headers because they are not considered data payload while maintaining the ALC metaframes $128_1, 128_2 \ldots 128_n$ in the Pivot Table file 405 (note: if desired this step could also be performed in the CVS file 403 rather than in the Pivot Table file 405). At step 410, the packet analyzer device 102 sorts the ALC metaframes $128_1, 128_2 \ldots 128_n$ based on the TOIs $304_1, 304_2 \ldots 304_n$. At step 410, the packet analyzer device 102 determines the number of the ALC metaframes $128_1, 128_2 \ldots 128_n$ per each TOI $304_1, 304_2 \ldots 304_n$ where the determined numbers are indicative of the number of packets received per each segment of multicast FEC encoded packets $124_1, 124_2 \ldots 124_n$ (see FIG. 7).

Figure 5:
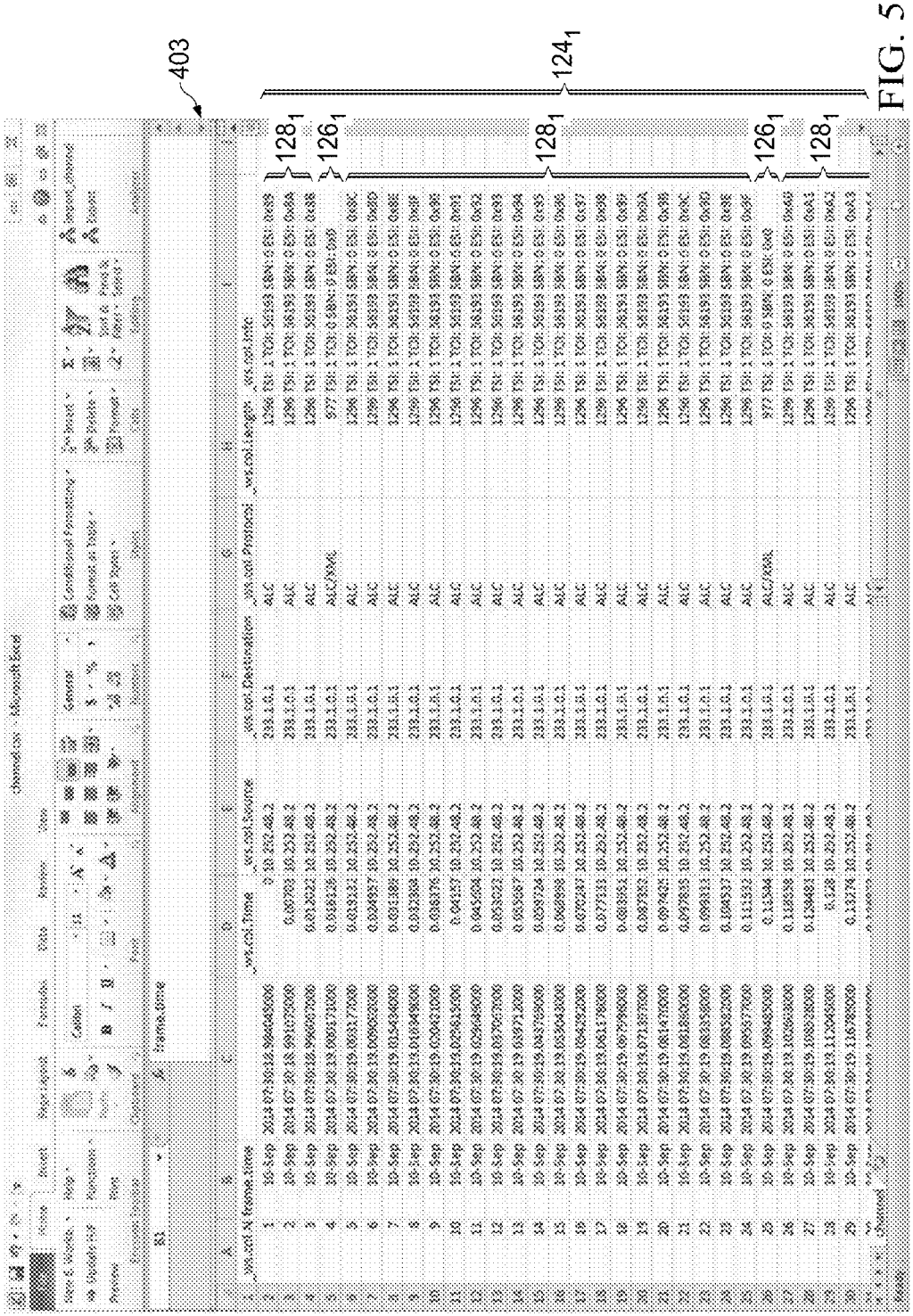

FIG. 5 is a snapshot image of an exemplary CVS file 403 that contains the captured header information which in this illustrative example there can be seen two ALC/XML FDT metaframes $126_1$ and a portion of the ALC metaframes $128_1$ which are obtained from the exemplary PCAP file 302. The CVS file 403 would contain all of the ALC/XML FDT metaframes $126_1, 126_2 \ldots 126_n$ and ALC metaframes $128_1, 128_2 \ldots 128_n$ for the single data stream. The CVS file 403 has the following fields: (A) ws.col.No; (B-C) frame.time; (D) ws.col.Time; (E) ws.col.Source—IP address; (F) ws.col.Destination—IP address; (G) ws.col.Protocol; (H) ws.col.length; and (I) ws.col.Info.

Figure 6:
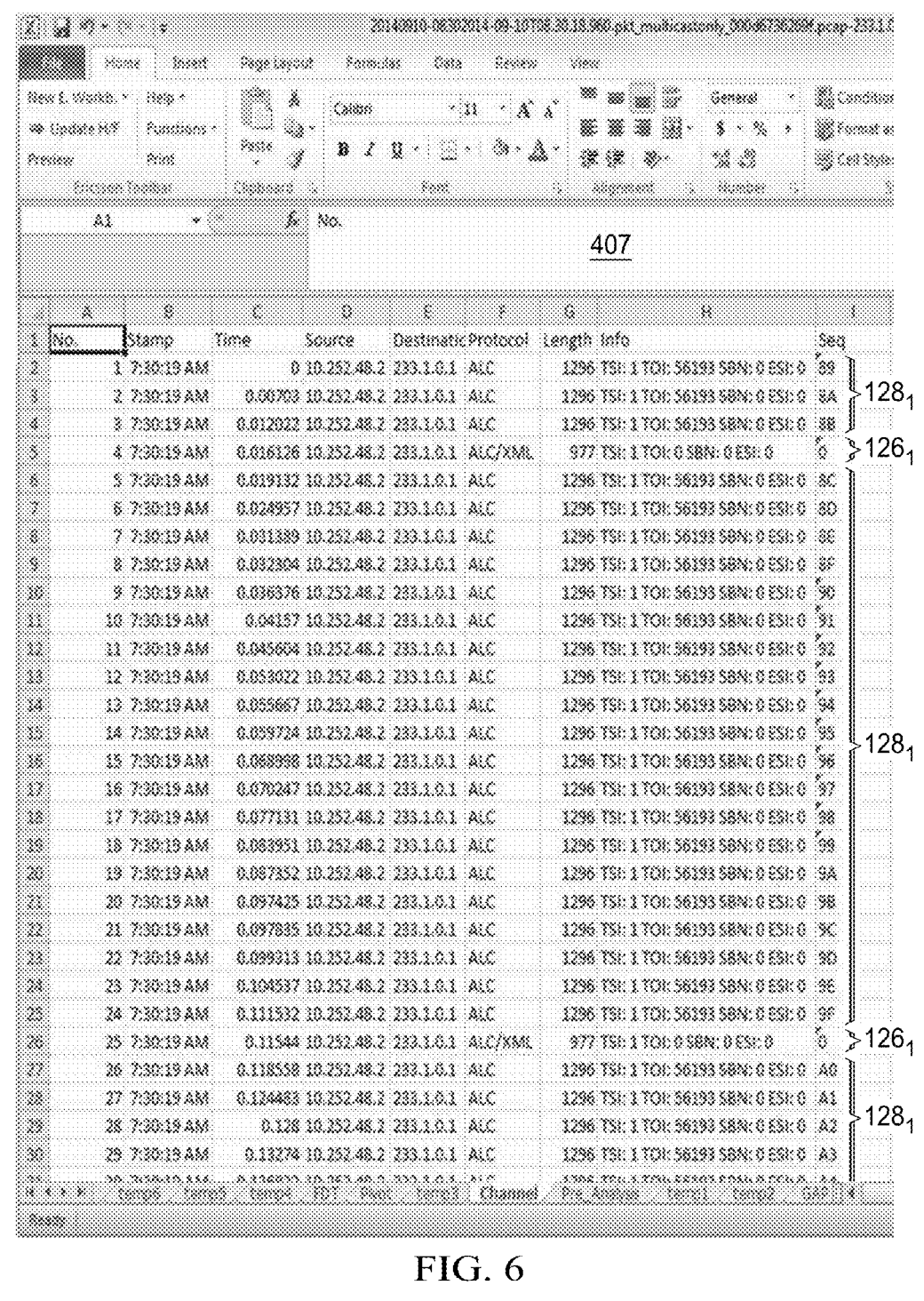

FIG. 6 is a snapshot image of an exemplary CVS file 407 that is similar to the snapshot of FIG. 5 but has the following fields: (A) ws.col.No; (B-C) stamp.time; (D) Source—IP address; (E) Destination—IP address; (F) Protocol; (G) length; (H) Info—which indicates TOIs; and (I) Seq—which was originally part of the Info field in FIG. 5. The sequence number identifies each packet/symbol created by the FEC encoder 112 during the FEC encoding process. The packet analyzer device 102 can analyze the sequence numbers to define the amount of packets received and identify packet loss patterns, which measure the amount of time where sequential packet loss occurred. This analysis provides leads as to the root cause of the packet loss such as due to beacon collision or controller reset.

Figure 7:
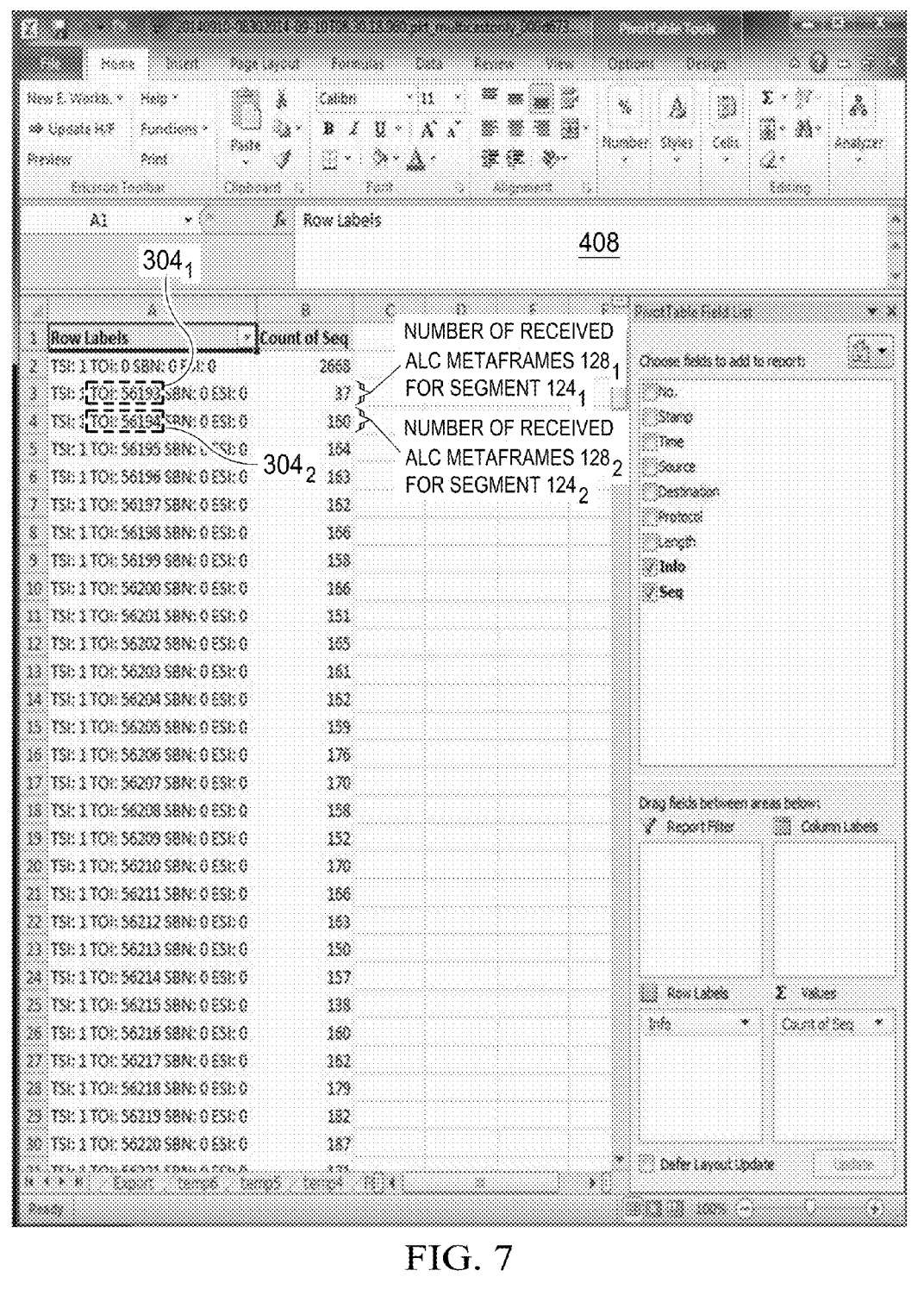

FIG. 7 is a snapshot image of the exemplary Pivot Table file 405 that indicates the number of the ALC metaframes $128_1, 128_2 \ldots 128_n$ per each TOI $304_1, 304_2 \ldots 304_n$ where these determined numbers are indicative of the number of packets received per each segment of multicast FEC encoded packets $124_1, 124_2 \ldots 124_n$. In this example, the Pivot Table file 405 indicates that 37 ALC metaframes $128_1$ have been received for segment $124_1$ which had TOI $304_1$ of "56193". In addition, Pivot Table file 405 indicates that 160 ALC metaframes $128_2$ have been received for segment $124_2$ which had TOI $304_2$ of "56194" and so on for all of the TOIs $304_1, 304_2 \ldots 304_n$ associated with segments $124_1, 124_2 \ldots 124_n$. In effect, the Pivot Table file 405 is used to consolidate the number of packets received per each TOI $304_1, 304_2 \ldots 304_n$ which corresponds to each segment of multicast FEC encoded packets $124_1, 124_2 \ldots 124_n$. In this example, the Pivot Table file 405 has a singular TOI entry and its respective number of frames/packets received.

Figure 8:
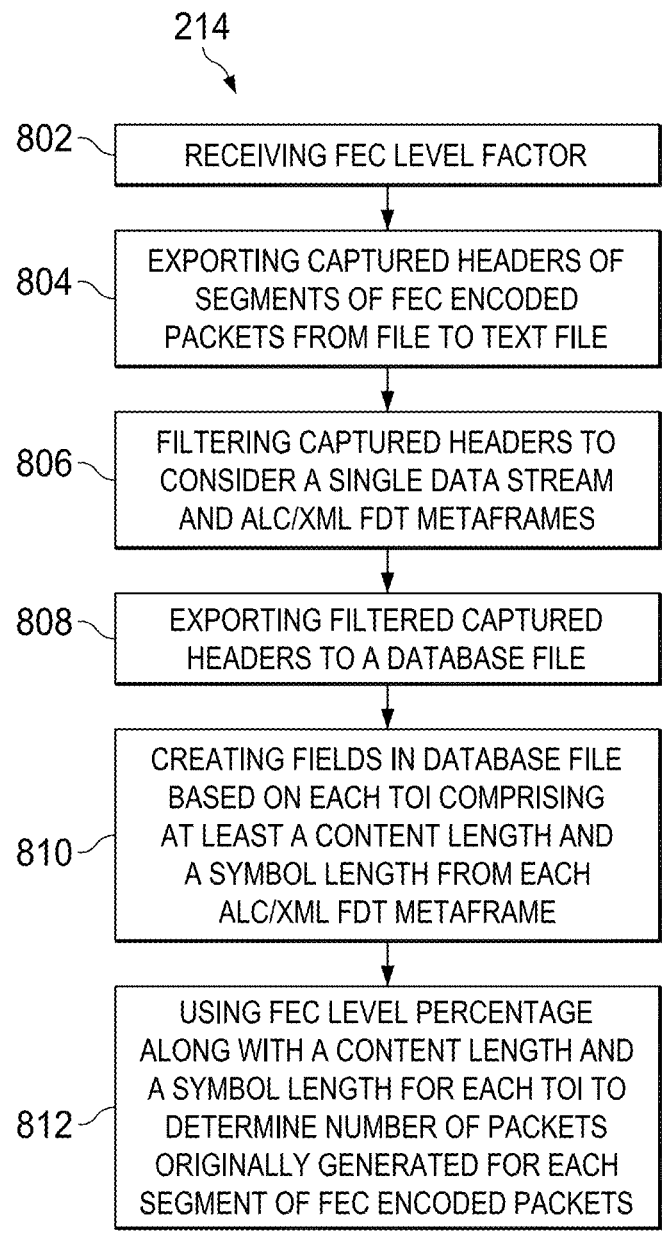

Referring to FIGS. 8-11, there are illustrated two flowcharts and several snapshot images of files 803 and 805 which are used to explain an exemplary way to implement the determining step 214 of method 200 in accordance with an embodiment of the present invention. As discussed above, the packet analyzer device 102 implements step 214 to determine the number of packets that had been originally generated by the FEC encoder 112 for each segment of the multicast FEC encoded packets $124_1$, $124_2$ . . . $124_n$. For example, the packet analyzer device 102 can implement step 214 by analyzing a FEC level factor 131 (a user input) that was used by the FEC encoder 112 to originally generate the multicast FEC encoded packets $124_1$, $124_2$ . . . $124_n$ along with a content length $306_1$, $306_2$ . . . $306_n$ (bytes) and a segment length $308_1$, $308_2$ . . . $308_n$ (bytes) which are obtained from each ALC/XML FDT metaframe $126_1$, $126_2$ . . . $126_n$ in the file 302 (see FIG. 3). FIG. 8 is a flowchart which illustrates the steps of an exemplary way that the packet analyzer device 102 can implement step 214 to determine the number of packets that had been originally generated by the FEC encoder 112 for each segment of the multicast FEC encoded packets $124_1$, $124_2$ . . . $124_n$. At step 802, the packet analyzer device 102 receives the FEC level factor 131 (a user input) that was used by the FEC encoder 112 to originally generate the segments of the multicast FEC encoded packets $124_1$, $124_2$ . . . $124_n$. At step 804, the packet analyzer device 102 exports captured headers (i.e., the ALC/XML FDT metaframe $126_1$, $126_2$ . . . $126_n$ and ALC metaframes $128_1$, $128_2$ . . . $128_n$) of the plurality of segments of multicast FEC encoded packets $124_1$, $124_2$ . . . $124_n$ within the file 302 (PCAP file 302) into a text file 803 (CVS file 803). At step 806, the packet analyzer device 102 filters the captured headers in the CVS file 803 to consider a single data stream and the ALC/XML FDT metaframes $126_1$, $126_2$ . . . $126_n$ while excluding the ALC metaframes $128_1$, $128_2$ . . . $128_n$ (see FIG. 9). For instance, the packet analyzer device 102 can select an IP multicast destination address which is used to filter the captured headers to only consider a single data stream. At step 808, the packet analyzer device 102 exports the filtered captured headers to a database file 805 (Pivot Table file 805) (note: if desired the captured headers could also be filtered in the Pivot Table file 805 rather than in the CVS file 803 to exclude the ALC metaframes $128_1$, $128_2$ . . . $128_n$ while maintaining the ALC/XML FDT metaframes $126_1$, $126_2$ . . . $126_n$). At step 810, the packet analyzer device 102 creates fields in the Pivot Table file 805 based on each TOI $304_1$, $304_2$ . . . $304_n$ whereby each field comprises at least the content length $306_1$, $306_2$ . . . $306_n$ and the symbol length $308_1$, $308_2$ . . . $308_n$ for each ALC/XML FDT metaframe $126_1$, $126_2$ . . . $126_n$ (see FIG. 10). At step 812, the packet analyzer device 102 uses the FEC level factor 131 along with the content length $306_1$, $306_2$ . . . $306_n$ and the segment length $308_1$, $308_2$ . . . $308_n$ for each TOI $304_1$, $304_2$ . . . $304_n$ to determine the number of packets that had been originally generated by the FEC encoder 112 for each segment of the multicast FEC encoded packets $124_1$, $124_2$ . . . $124_n$ (see FIG. 11 for exemplary way to implement the using step 812 based on the FLUTE RAPTORQ protocol).

Figure 9:
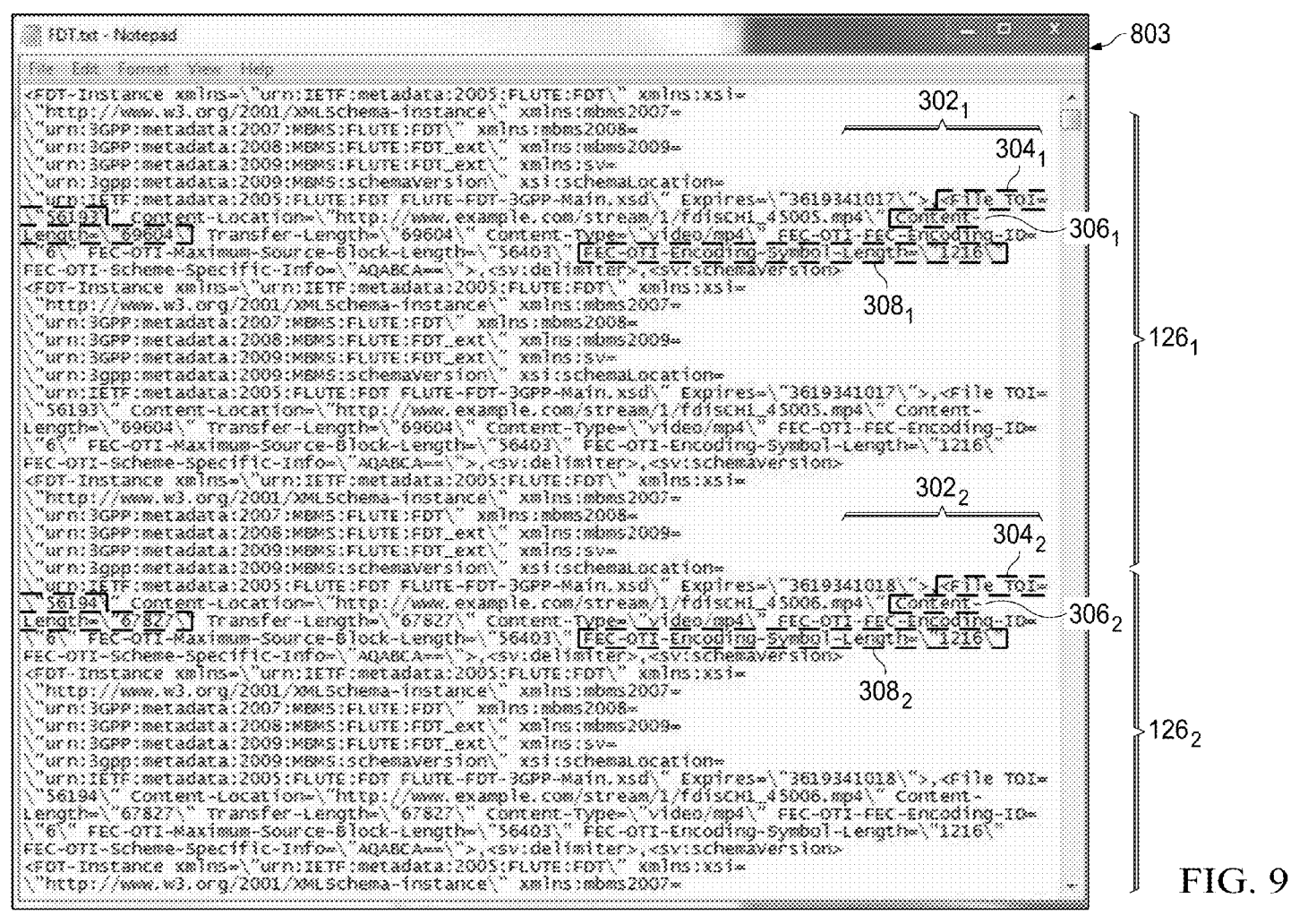

FIG. 9 is a snapshot image of an exemplary CVS file 803 that contains the captured header information which in this illustrative example there is shown the content $302_1$ and $302_2$ of the ALC/XML FDT metaframes $126_1$ and $126_2$ obtained from the exemplary PCAP file 302. The CVS file 803 would contain all of the content $302_1$, $302_2$ . . . $302_n$ of the ALC/XML FDT metaframes $126_1$, $126_2$ . . . $126_n$ for the single data stream.

Figure 10:
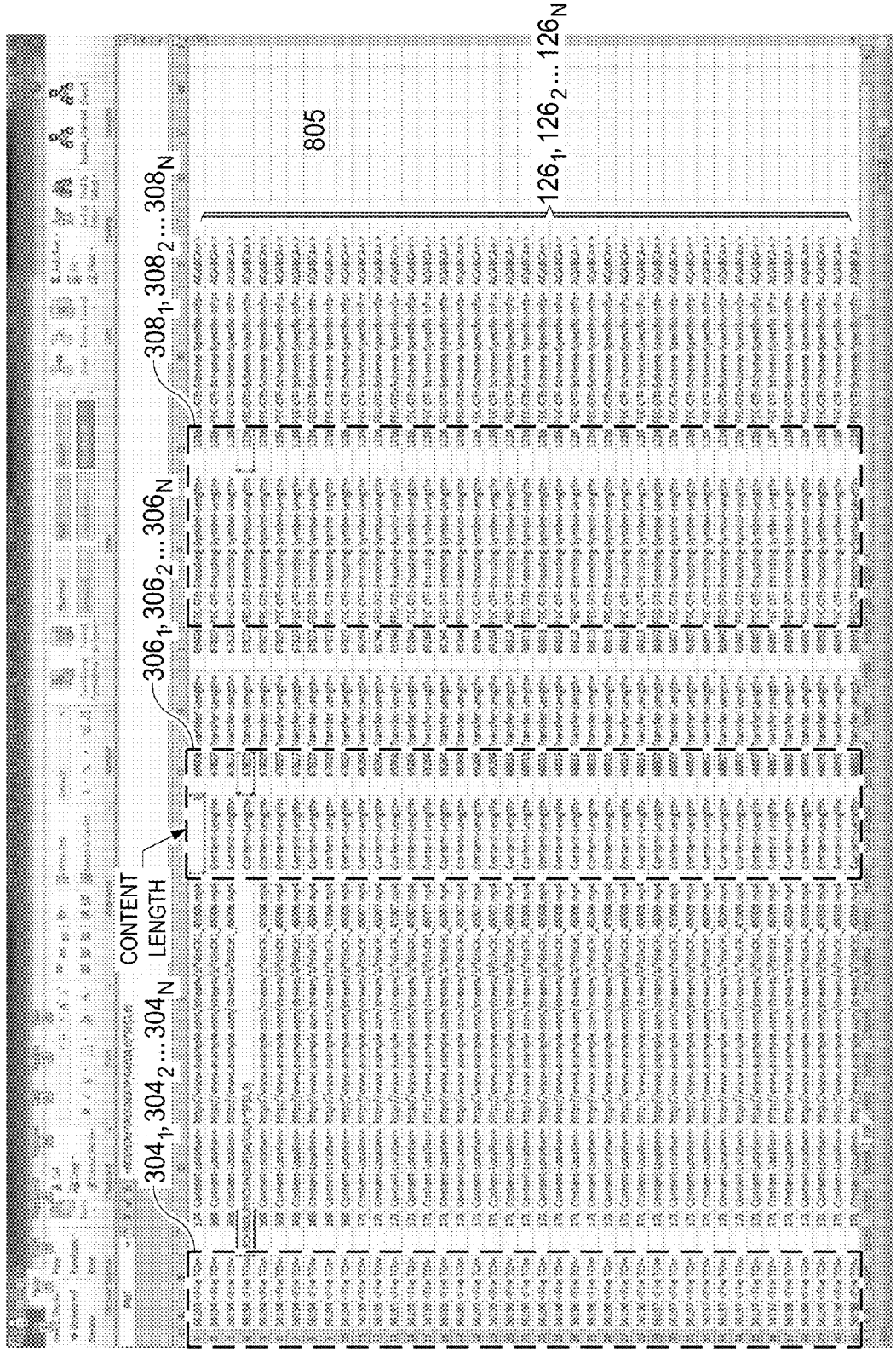

FIG. 10 is a snapshot image of the Pivot Table file 805 illustrating fields which include: TOIs $304_1$, $304_2$ . . . $304_n$; content length $306_1$, $306_2$ . . . $306_n$; and the symbol length $308_1$, $308_2$ . . . $308_n$ for each ALC/XML FDT metaframe $126_1$, $126_2$ . . . $126_n$. In this example, the TOI $304_1$ is "56193", the content length $306_1$ is "69604" and the symbol length $308_1$ is "1216". The TOI $304_2$ is "56194", the content length $306_2$ is "67827" and the symbol length $308_2$ is "1216" and so on for the remaining TOIs $304_3$, $304_4$ . . . $304_n$.

FIG. 11 is a flowchart which illustrates the steps of an exemplary way that the packet analyzer device 102 can implement the using step 812 to determine the number of packets that had been originally generated by the FEC encoder 112 for one of the segments of the multicast FEC encoded packets $124_1$. At step 1102, the packet analyzer device 102 divides the content length $306_1$ into the symbol length $308_1$ for TOI $304_1$ to obtain a first value. At step 1104, the packet analyzer device 102 rounds-up the first value to nearest integer to obtain a first rounded-up value. At step 1106, the packet analyzer device 102 multiplies the first rounded-up value and the FEC level factor 131 to obtain a second value. At step 1108, the packet analyzer device 102 rounds-up the second value to nearest integer to obtain a second rounded-up value, wherein the second rounded-up value is indicative of the number of packets that had been originally generated by the FEC encoder 112 for the one segment of the multicast FEC encoded packets $124_1$. The packet analyzer device 102 would repeat steps 1102, 1104, 1106 and 1108 for "n" times to determine the number of packets that had been originally generated by the FEC encoder 112 for each segment of the multicast FEC encoded packets $124_1$, $124_2$ . . . $124_n$. It should be appreciated that steps 1102, 1104, 1106 and 1108 were specifically designed for the case when the FEC encoder 112 implemented FLUTE's RaptorQ protocol to generate each segment of the multicast FEC encoded packets $124_1$, $124_2$ . . . $124_n$. Further, the steps 1102, 1104, 1106 and 1108 were specifically designed with the assumption that there is one symbol carried per packet $124_1$, $124_2$ . . . $124_n$.

Figure 13:
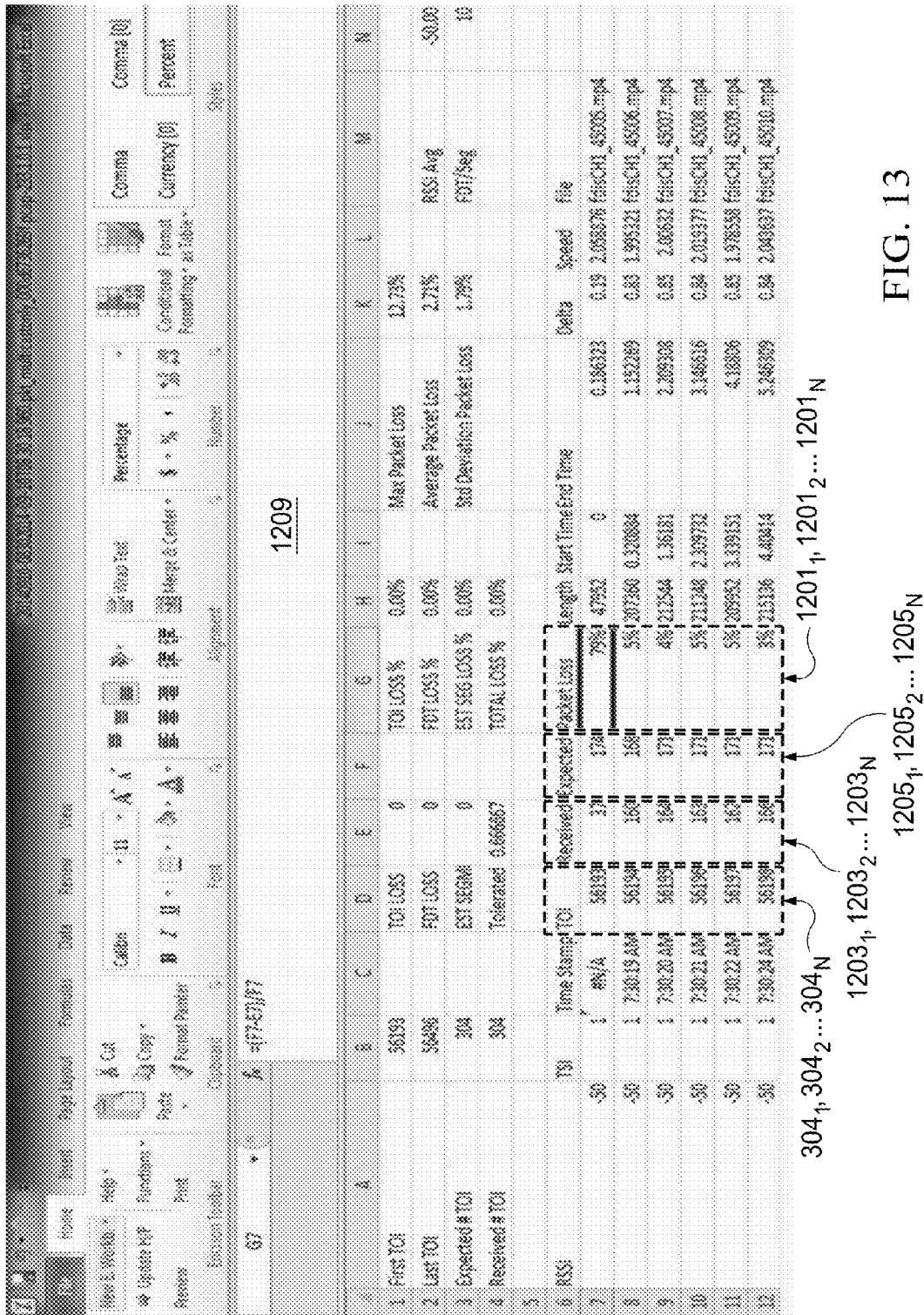

Referring to FIGS. 12-13, there are illustrated a flowchart and a snapshot image which are used to explain an exemplary way to implement the analyzing step 216 of method 200 in accordance with an embodiment of the present invention. The packet analyzer device 102 implements the analyzing step 216 by using the results of steps 212 and 214 in addition to possibly using the FEC level factor 131 to determine one or more KPIs 130 which are indicative of the video quality of the transmitted IP multicast media 104. For instance, the KPIs 130 can be one or more of the following:

(1) A packet loss percentage for each segment of the multicast FEC encoded packets $124_1$, $124_2$ . . . $124_n$ (see FIGS. 12-13).

(2) A segment loss due to a packet loss which is higher than a threshold. For instance, this KPI 130 could be determined by using the FEC level factor 131 to determine a percentage threshold and then compare it with the packet loss percentage $120_1$, $1201_2$ . . . $1201_n$ of each segment of the multicast FEC encoded packets $124_1$, $124_2$ . . . $124_n$. The percentage threshold=FEC %/(FEC %+100%). For instance, using a FEC level factor 131 of 200% would result percentage threshold around 67%. Then, the segment loss % is measured by comparing the amount of segments marked as lost due to excessive packet loss compared with the total amount of segments received. If it is determined that there is a segment loss due to a packet loss which is higher than a threshold, then this means that the FEC level factor 131 used by the FEC encoder 112 is not sufficient to protect the segments of the multicast FEC encoded packets $124_1$, $124_2$ . . . $124_n$ where this problem is mostly likely caused by a high interference level.

(3) A segment loss due to the loss of a FDT instance packet (ALC/XML FDT metaframe $126_1, 126_2 \ldots 126_n$). In the case where the FDT instance packet is compromised, then the entire set of packets related to that particular segment will be counted as lost due the fact that any good FLUTE packets which are received by the packet analyzer device 102 (and user device 129) would not be able to the decoded.

(4) A segment loss due to TOI loss: This means that a segment was lost because no FLUTE packets were received for a specific segment $124_1, 124_2 \ldots 124_n$. For instance, this may be caused when the access point 116 is re-booted.

FIG. 12 is a flowchart which illustrates the steps of an exemplary way that the packet analyzer device 102 can implement the analyzing step 216 of method 200 to identify the packet loss percentage for each segment of the multicast FEC encoded packets $124_1, 124_2 \ldots 124_n$ in accordance with an embodiment of the present invention. At step 1202, the packet analyzer device 102 retrieves the number of packets $1203_k, 1203_2 \ldots 1203_n$ received per each TOI $304_1, 304_2 \ldots 304_n$ (determined by step 212) and the number of packets $1205_1, 1205_2 \ldots 1205_n$ originally generated per each TOI $304_1, 304_2 \ldots 304_n$ (determined by step 214) (see also FIG. 13). At step 1204, the packet analyzer device 102 determines the packet loss percentage $1201_1, 1201_2 \ldots 1201_n$ for each segment of the multicast FEC encoded packets $124_1, 124_2 \ldots 124_n$ by comparing the number of packets $1203_1, 1203_2 \ldots 1203_n$ received in each TOI $304_1, 304_2 \ldots 304_n$ to the number of packets $1205_1, 1205_2 \ldots 1205_n$ that had been originally generated for each TOI $304_1, 304_2 \ldots 304_n$. At step 1206, the packet analyzer device 102 updates a database file 1207 (Pivot Table file 1207) with the packet loss percentage for each TOI $304_1, 304_2 \ldots 304_n$. At step 1208, the packet analyzer device 102 creates a database view 1209 by consolidating the packet loss percentage $1201_1, 1201_2 \ldots 1201_n$ for all of the TOIs $304_1, 304_2 \ldots 304_n$ stored in the Pivot Table file 1207. At step 1210, the packet analyzer device 102 displays on the display 209 or otherwise outputs the packet loss percentages $1201_1, 1201_2 \ldots 1201_n$ for all of the TOIs $304_1, 304_2 \ldots 304_n$ (see FIG. 13).

FIG. 13 is a snapshot image of the database view 1209 which indicates the packet loss percentage $1201_1, 1201_2 \ldots 1201_n$ for each of the TOIs $304_1, 304_2 \ldots 304_n$. In this example, the database view 1209 has the following fields: TOIs $304_1, 304_2 \ldots 304_n$; received packets $1203_1, 1203_2 \ldots 1203_n$ (determined in step 212); expected packets $1205_1, 1205_2 \ldots 1205_n$ (determined in step 214); and packet loss percentages $1201_1, 1201_2 \ldots 1201_n$ (determined in step 216 and steps 1202, 1204, 1206, 1208 and 1210).

From the foregoing, one skilled in the art can readily appreciate that the packet analyzer device 102 described herein which measures the video quality (packet loss) of transmitted IP multicast media is innovative as it counts packets received only in the receptor (e.g., the packet analyzer device 102) and estimates the transmitted amount of packets based on FLUTE FDT instances. As described above, the packet analyzer device 102 implements method 200 to measure packet loss by collecting data by a single probe, using the collected (intercepted) special XML/ALC packets called FDT instances to calculate the amount of packets originally generated per video/data segment, using the collected special ALC packets to determine the actual number of packets which were captured, and the comparing this information to measure the packet loss. This method effectively eliminates the need of having several probes in the network to determine packet loss. In addition, the packet analyzer device 102 may also receive as an input the FEC level factor 131 (percentage) set at the FEC encoder 112 and then use the FEC level factor 131 to determine (define) the maximum packet loss that can be tolerated by the user device 129. The packet analyzer device has many advantages some of which are as follows:

Measure packet loss using just one probe.
Measure the average and standard deviation of packet loss for multicast traffic that is encoded per the FLUTE protocol using a single probe approach.
No need to decode the FEC payload.
Capability to provide packet loss information without having to rely on RTP protocol information.
The packet analyzer device 102 may be a distributed device with a receiver in the field that captures the IP multicast media and other components located remotely the analyzes the captured IP multicast media to determine the video quality of the captured IP multicast media.

The packet analyzer device 102 is particularly well-suited to be utilized in a Wi-Fi environment because the access point 116 does not receive any sort of acknowledgments from the user device 129 which indicate that the user device 129 successfully received the transmitted packets. Further, Wi-Fi often operates in a high interference environment (for instance a stadium) which causes a very high amount of corrupted packets which are discarded by the operational system of the user device 129 and become packet losses for the application level of the user device 129. Therefore, the packet analyzer device 102 is particularly well-suited for use in the Wi-Fi environment or similar environments as an optimization tool good for radio frequency network optimization, FEC optimization, quality of experience measurement and troubleshooting.

As discussed above, the packet analyzer device 102 is configured to measure the video quality of transmitted IP multicast media 104 by performing method 200 which effectively has four phases that can be characterized as: (1) Packet Capture; (2) Frames/Packets Reception Determination; (3) Frames/Packets Generation Determination; and (4) Average Frame/Packet Loss Determination. Exemplary ways that these phases can be implemented are discussed in more detail below:

Packet Capture: The phase requires the use of a packet data collector which will store frames/packets from the IP media to be analyzed, where the IP media can be any type of media received by fiber optics, UTP Ethernet or Wi-Fi. The data collected can be stored in a PCAP file. A more detailed discussion about this particular phase has been provided above with respect to FIG. 3.

Frames/Packets Reception Determination: This phase involves the manipulation of the PCAP file by exporting the captured headers without the payload to a database. Then the exported captured headers are filtered to only consider a single data stream, for instance single IP multicast address, that will be analyzed. This filtering also includes the removal of the ALC/XML FDT metadata frames as those are not considered data payload. As result of the above mentioned steps, one can have a database view including the following header information as database fields: Frame Number, Time Stamp, Source IP address, Destination IP address, Length and Information. The Information header has concatenated data that is further exploded and included as separate fields in the database, the separate fields are TOI and Sequence. A Pivot Table database is used to consolidate the number of packets received per TOI segment, this view will have a singular TOI entry and its respective number of Frames/

Packets received. A more detailed discussion about this particular phase has been provided above with respect to FIGS. 4-7.

Frames/Packets Generation Determination: This phase uses as input the same PCAP trace used in the previous phase. As a first step the ALC/XML FDT metadata is extracted from the PCAP file and exported into a text file. This text file is post processed to a CSV file and used as input to the database. The database has following fields/data: TOI, Source Length, Symbol Length, File Name. This phase also requires the FEC level factor (percentage) as user input and this FEC level factor is considered to be constant through the entire packet analysis. The database is consolidated to a singular TOI entry, and then the number of frames/packets generated will be determined as function of Content Length, Symbol Length and FEC level factor. The number of frames/packets generated is included in the database as a dedicated field for each TOI entry. A more detailed discussion about this particular phase has been provided above with respect to FIGS. 8-11.

Average Frame/Packet Loss Determination: Once the previous phases have been executed, the database will have the following relevant data fields: TOI, Number of Received Frames/Packets and Number of Generated Frames/Packets. Based on this information the database will have an additional filed: Frame/Packet Loss. This data will be a single value per TOI entry and will be determined as function of the received number of frames/packets and the generated number of frames/packets. The frame/packet loss per TOI entry will be updated in the database at its respective field, and then consolidated as frame/packet loss average function and frame/packet loss standard deviation function as dynamic variables. These dynamic variables swill be the final result of this phase. A more detailed discussion about this particular phase has been provided above with respect to FIGS. 12-13.

Although one embodiment of the present invention has been illustrated in the accompanying Drawings and described in the foregoing Detailed Description, it should be understood that the invention is not limited to the disclosed embodiment, but instead is also capable of numerous rearrangements, modifications and substitutions without departing from the present invention that as has been set forth and defined within the following claims.

The invention claimed is:

1. A packet analyzer device configured to measure a video quality of transmitted Internet Protocol (IP) multicast media, the packet analyzer device comprising:
at least one processor; and,
at least one memory that stores processor-executable instructions, wherein the at least one processor interfaces with the at least one memory to execute the processor-executable instructions, whereby said packet analyzer device is operable to:
capture the IP multicast media comprising a plurality of segments of multicast Forward Error Correction (FEC) encoded packets, wherein each segment of multicast FEC encoded IP packets comprises at least one File Delivery Table (FDT) and multiple packets, wherein each of the at least one FDT and the multiple packets has a Transport Object Identifier (TOI);
determine a number of packets received in each segment of the multicast FEC encoded packets;
determine a number of packets that had been originally generated for each segment of the multicast FEC encoded packets; and,
analyze at least the number of packets received in each segment of the multicast FEC encoded packets and the number of packets that had been originally generated for each segment of the multicast FEC encoded packets to determine one or more Key Performance Indicators (KPIs) indicative of the video quality of the IP multicast media, wherein the analyze operation further comprises identifying a packet loss percentage for each segment by comparing on a segment basis the number of packets received in each segment of the multicast FEC encoded packets to the number of packets that had been originally generated for each segment of the multicast FEC encoded packets.

2. The packet analyzer device of claim 1, wherein the capture operation further comprises storing the captured plurality of segments of multicast FEC encoded packets in a file.

3. A packet analyzer device configured to measure a video quality of transmitted Internet Protocol (IP) multicast media, the packet analyzer device comprising:
at least one processor; and,
at least one memory that stores processor-executable instructions, wherein the at least one processor interfaces with the at least one memory to execute the processor-executable instructions, whereby said packet analyzer device is operable to:
capture the IP multicast media comprising a plurality of segments of multicast Forward Error Correction (FEC) encoded packets, wherein each segment of multicast FEC encoded IP packets comprises at least one File Delivery Table (FDT) and multiple packets, wherein each of the at least one FDT and the multiple packets has a Transport Object Identifier (TOI), and wherein the capture operation further comprises storing the captured plurality of segments of multicast FEC encoded packets in a file;
determine a number of packets received in each segment of the multicast FEC encoded packets by determining a number of Asynchronous Layered Coding (ALC) metaframes per each Transport Object Identifier (TOI) within the file, wherein the number of the ALC metaframes per each TOI is indicative of the number of packets received per each segment of multicast FEC encoded packets;
determine a number of packets that had been originally generated for each segment of the multicast FEC encoded packets; and,
analyze at least the number of packets received in each segment of the multicast FEC encoded packets and the number of packets that had been originally generated for each segment of the multicast FEC encoded packets to determine one or more Key Performance Indicators (KPIs) indicative of the video quality of the IP multicast media.

4. The packet analyzer device of claim 3, wherein the packet analyzer device is further operable to determine the number of ALC metaframes per each Transport Object Identifier (TOI) by:
exporting captured headers of the plurality of segments of multicast FEC encoded packets within the file into a text file;
filtering the captured headers in the text file to consider a single data stream;
exporting the filtered captured headers to a database file;
excluding Extensible Markup Language/Asynchronous Layered Coding (ALC/XML) FDT metaframes from the filtered captured headers while maintaining the ALC metaframes in the database file;
sorting the ALC metaframes based on the TOIs; and
determining the number of the ALC metaframes per each TOI.

5. A packet analyzer device configured to measure a video quality of transmitted Internet Protocol (IP) multicast media, the packet analyzer device comprising:
at least one processor; and,
at least one memory that stores processor-executable instructions, wherein the at least one processor interfaces with the at least one memory to execute the processor-executable instructions, whereby said packet analyzer device is operable to:
capture the IP multicast media comprising a plurality of segments of multicast Forward Error Correction (FEC) encoded packets, wherein each segment of multicast FEC encoded IP packets comprises at least one File Delivery Table (FDT) and multiple packets, wherein each of the at least one FDT and the multiple packets has a Transport Object Identifier (TOI), and wherein the capture operation further comprises storing the captured plurality of segments of multicast FEC encoded packets in a file;
determine a number of packets received in each segment of the multicast FEC encoded packets;
determine a number of packets that had been originally generated for each segment of the multicast FEC encoded packets by analyzing a FEC level factor used to originally generate the segments of the multicast FEC encoded packets along with a content length and a symbol length obtained from each Extensible Markup Language/Asynchronous Layered Coding (ALC/XML) FDT metaframe in the file; and,
analyze at least the number of packets received in each segment of the multicast FEC encoded packets and the number of packets that had been originally generated for each segment of the multicast FEC encoded packets to determine one or more Key Performance Indicators (KPIs) indicative of the video quality of the IP multicast media.

6. The packet analyzer device of claim 5, wherein the packet analyzer device is further operable to determine the number of packets that had been originally generated for each segment of the multicast FEC encoded packets by:
receiving the FEC level factor used to originally generate the segments of multicast FEC encoded packets;
exporting captured headers of the plurality of segments of multicast FEC encoded packets within the file into a text file;
filtering the captured headers in the text file to consider a single data stream and the ALC/XML FDT metaframes;
exporting the filtered captured headers to a database file;
creating fields in the database file based on each TOI comprising at least the content length and the symbol length for each ALC/XML FDT metaframe; and,
using the FEC level factor along with the content length and the symbol length for each TOI to determine the number of packets that had been originally generated for each segment of the multicast FEC encoded packets.

7. The packet analyzer device of claim 6, wherein the using operation for one of the TOI further comprises:
dividing the content length into the symbol length for the one TOI to obtain a first value;
rounding-up the first value to nearest integer to obtain a first rounded-up value;
multiplying the first rounded-up value and the FEC level factor to obtain a second value; and
rounding-up the second value to nearest integer to obtain a second rounded-up value, wherein the second rounded-up value is indicative of the number of packets that had been originally generated for one of the segments of the multicast FEC encoded packets.

8. The packet analyzer device of claim 1, wherein the identify operation further comprises:
retrieving the number of packets received per each TOI and the number of packets originally generated per each TOI;
determining the packet loss percentage for each segment by comparing the number of packets received in each TOI to the number of packets that had been originally generated for each TOI;
updating a database file with the packet loss percentage for each TOI;
creating a database view consolidating the packet loss percentage for all of the TOIs; and,
displaying the packet loss percentage for all of the TOIs.

9. The packet analyzer device of claim 1, wherein the one or more KPIs comprises at least one of following: (1) a packet loss percentage for each segment of the of the multicast FEC encoded packets; (2) a segment loss due to a packet loss which is higher than a threshold; (3) a segment loss due to a FDT loss; and (4) a segment loss due to a TOI loss.

10. A method in a packet analyzer device for measuring a video quality of transmitted Internet Protocol (IP) multicast media, the method comprising:
capturing the IP multicast media comprising a plurality of segments of multicast Forward Error Correction (FEC) encoded packets, wherein each segment of multicast FEC encoded IP packets comprises at least one File Delivery Table (FDT) and multiple packets, wherein each of the at least one FDT and the multiple packets has a Transport Object Identifier (TOI);
determining a number of packets received in each segment of the multicast FEC encoded packets;
determining a number of packets that had been originally generated for each segment of the multicast FEC encoded packets; and,
analyzing at least the number of packets received in each segment of the multicast FEC encoded packets and the number of packets that had been originally generated for each segment of the multicast FEC encoded packets to determine one or more Key Performance Indicators (KPIs) indicative of the video quality of the IP multicast media, wherein the analyzing operation further comprises identifying a packet loss percentage for each segment by comparing on a segment basis the number of packets received in each segment of the multicast FEC encoded packets to the number of packets that had been originally generated for each segment of the multicast FEC encoded packets.

11. The method of claim 10, wherein the capture operation further comprises storing the captured plurality of segments of multicast FEC encoded packets in a file.

12. A method in a packet analyzer device for measuring a video quality of transmitted Internet Protocol (IP) multicast media, the method comprising:
capturing the IP multicast media comprising a plurality of segments of multicast Forward Error Correction (FEC) encoded packets, wherein each segment of multicast FEC encoded IP packets comprises at least one File Delivery Table (FDT) and multiple packets, wherein each of the at least one FDT and the multiple packets has a Transport Object Identifier (TOI), and wherein the capture operation further comprises storing the captured plurality of segments of multicast FEC encoded packets in a file;

determining a number of packets received in each segment of the multicast FEC encoded packets by determining a number of Asynchronous Layered Coding (ALC) metaframes per each Transport Object Identifier (TOI) within the file, wherein the number of the ALC metaframes per each TOI is indicative of the number of packets received per each segment of multicast FEC encoded packets;

determining a number of packets that had been originally generated for each segment of the multicast FEC encoded packets; and, analyzing at least the number of packets received in each segment of the multicast FEC encoded packets and the number of packets that had been originally generated for each segment of the multicast FEC encoded packets to determine one or more Key Performance Indicators (KPIs) indicative of the video quality of the IP multicast media.

13. The method of claim 12, wherein the operation of determining the number of ALC metaframes per each Transport Object Identifier (TOI) further comprises:

exporting captured headers of the plurality of segments of multicast FEC encoded packets within the file into a text file;

filtering the captured headers in the text file to consider a single data stream;

exporting the filtered captured headers to a database file;

excluding Extensible Markup Language/Asynchronous Layered Coding (ALC/XML) FDT metaframes from the filtered captured headers while maintaining the ALC metaframes in the database file;

sorting the ALC metaframes based on the TOIs; and determining the number of the ALC metaframes per each TOI.

14. A method in a packet analyzer device for measuring a video quality of transmitted Internet Protocol (IP) multicast media, the method comprising:

capturing the IP multicast media comprising a plurality of segments of multicast Forward Error Correction (FEC) encoded packets, wherein each segment of multicast FEC encoded IP packets comprises at least one File Delivery Table (FDT) and multiple packets, wherein each of the at least one FDT and the multiple packets has a Transport Object Identifier (TOI), and wherein the capture operation further comprises storing the captured plurality of segments of multicast FEC encoded packets in a file;

determining a number of packets received in each segment of the multicast FEC encoded packets;

determining a number of packets that had been originally generated for each segment of the multicast FEC encoded packets by analyzing a FEC level factor used to originally generate the segments of the multicast FEC encoded packets along with a content length and a symbol length obtained from each Extensible Markup Language/Asynchronous Layered Coding (ALC/XML) FDT metaframe in the file; and, analyzing at least the number of packets received in each segment of the multicast FEC encoded packets and the number of packets that had been originally generated for each segment of the multicast FEC encoded packets to determine one or more Key Performance Indicators (KPIs) indicative of the video quality of the IP multicast media.

15. The method of claim 14, wherein the operation of determining the number of packets that had been originally generated for each segment of the multicast FEC encoded packets:

receiving the FEC level factor used to originally generate the segments of multicast FEC encoded packets;

exporting captured headers of the plurality of segments of multicast FEC encoded packets within the file into a text file;

filtering the captured headers in the text file to consider a single data stream and the ALC/XML FDT metaframes;

exporting the filtered captured headers to a database file;

creating fields in the database file based on each TOI comprising at least the content length and the symbol length for each ALC/XML FDT metaframe; and, using the FEC level factor along with the content length and the symbol length for each TOI to determine the number of packets that had been originally generated for each segment of the multicast FEC encoded packets.

16. The method of claim 15, wherein the using operation for one of the TOIs further comprises:

dividing the content length into the symbol length for the one TOI to obtain a first value;

rounding-up the first value to nearest integer to obtain a first rounded-up value;

multiplying the first rounded-up value and the FEC level factor to obtain a second value; and rounding-up the second value to nearest integer to obtain a second rounded-up value, wherein the second rounded-up value is indicative of the number of packets that had been originally generated for one of the segments of the multicast FEC encoded packets.

17. The method of claim 10, wherein the identifying operation further comprises:

retrieving the number of packets received per each TOI and the number of packets originally generated per each TOI;

determining the packet loss percentage for each segment by comparing the number of packets received in each TOI to the number of packets that had been originally generated for each TOI;

updating a database file with the packet loss percentage for each TOI;

creating a database view consolidating the packet loss percentage for all of the TOIs; and, displaying the packet loss percentage for all of the TOIs.

18. The method of claim 10, wherein the one or more KPIs comprises at least one of following: (1) a packet loss percentage for each segment of the of the multicast FEC encoded packets; (2) a segment loss due to a packet loss which is higher than a threshold; (3) a segment loss due to a FDT loss; and (4) a segment loss due to a TOI loss.

* * * * *